United States Patent [19]

Wakabayashi

[11] Patent Number: 5,440,543
[45] Date of Patent: Aug. 8, 1995

[54] DUPLEX SYSTEM USING A SINGLE TRANSMISSION LINE

[75] Inventor: Takao Wakabayashi, Osaka, Japan

[73] Assignee: Nakanishi Metal Works Co., Ltd., Osaka, Japan

[21] Appl. No.: 146,741

[22] Filed: Jun. 5, 1992

[30] Foreign Application Priority Data

Jun. 7, 1991 [JP] Japan ................... 3-136841

[51] Int. Cl.⁶ .................. H04L 5/14; H04L 27/00; H03D 3/02
[52] U.S. Cl. .................... 370/24; 375/259; 375/269; 327/3; 327/7
[58] Field of Search ............ 370/24, 27, 28, 32, 370/85.1, 11, 12, 114; 375/7, 8, 36, 42, 9, 24, 17, 37; 307/510, 514, 516, 522, 350, 354, 362, 236

[56] References Cited

U.S. PATENT DOCUMENTS

| 4,516,236 | 5/1985 | Hadziomerovi | 370/24 |
| 4,543,541 | 9/1985 | Norton | 332/101 |
| 4,580,276 | 4/1986 | Andruzzi, Jr. et al. | 375/9 |
| 4,740,952 | 4/1988 | Vernieres et al. | 370/24 |
| 5,084,637 | 1/1992 | Gregor | 375/7 |

FOREIGN PATENT DOCUMENTS 0184325 11/1986 United Kingdom .
0385695 5/1990 United Kingdom .

OTHER PUBLICATIONS

Patent Abstract of Japan, vol. 9, No. 143 (E-322) Jun. 18, 1985.

Primary Examiner—Hassan Kizou
Attorney, Agent, or Firm—Armstrong, Westerman, Hattori, McLeland & Naughton

[57] ABSTRACT

A signal transmitter-receiver system comprising first and second transmitter-receiver units interconnected by a signal transmission line, a first transmitter-receiver unit including a first transmission circuit for delivering a selected one of a plurality of a.c. signals each having a distinct phase difference with respect to a reference a.c. signal to the signal transmission line at each of successive predetermined communication time interval, the second transmitter-receiver unit including a second receiving circuit for identifying the phase difference of the a.c. signal or the signal transmission line with respect to the reference a.c. signal at each communication time interval, the second transmitter-receiver unit including a second transmission circuit for changing the combination of positive and negative amplitudes of the a.c. signal on the signal transmission line to one of a plurality of states at each communication time interval, the first transmitter-receiver unit including a first receiver circuit for identifying the state of the combination of positive and negative amplitudes of the a.c. signal of the signal transmission line at each communication time interval.

6 Claims, 9 Drawing Sheets

FREQUENCY $f1=10kHz$     "1"

FREQUENCY $f0=30kHz$     "0"

DUPLEX SYSTEM USING A SINGLE TRANSMISSION LINE

BACKGROUND OF THE INVENTION

The present invention relates to signal transmitter-receiver systems which comprise two transmitter-receiver units adapted for simultaneous bidirectional signal transmission therebetween with use of a single signal transmission line For example in conveyors having a plurality of carriers which are self-propelled to run along a rail, there is a need for bidirectional signal transmission between the carrier and a control station on the ground.

If different signal transmission lines are provided specifically for the transmission of signals in different directions and for different signals, signals can be transmitted simultaneously and bidirectionally, whereas the system then requires a very large number of signal transmission lines for handling an increased number of signals and is therefore uneconomical.

Accordingly, a multiplex signal transmitter-receiver system has been proposed which is adapted for bidirectional transmission of a plurality of signals through a single signal line by the time division method (see Examined Japanese Patent Publication SHO 55-3857).

With the proposed system, however, transmission and receiving are effected alternatively by the time division method, such that strictly speaking, transmission and receiving are not accomplished at the same time. With an increase in the number of signals, therefore, a longer period of time is required for the bidirectional transmission of signals, consequently limiting the number of signals to be transmitted or received through the single signal transmission line.

SUMMARY OF THE INVENTION

The main object of the present invention is to obviate the above problems and to provide a signal transmitter-receiver system adapted for simultaneous bidirectional transmission of signals through a single signal transmission line.

The present invention provides as a first feature thereof a signal transmitter-receiver system comprising first and second two transmitter-receiver units interconnected by a signal transmission line, the first transmitter-receiver unit including first transmission means for delivering one of different kinds of a.c. signals different in phase difference with respect to a reference a.c. signal to the signal transmission line at every predetermined communication time, the second transmitter-receiver unit including second receiving means for identifying the phase difference of the a.c. signal on the signal transmission line with respect to the reference a.c. signal at every communication time mentioned, the second transmitter-receiver unit including second transmission means for changing the combination of positive and negative amplitudes of the a.c. signal on the signal transmission line to one of a plurality of kinds at every communication time mentioned, the first transmitter-receiver unit including first receiving means for identifying the combination of positive and negative amplitudes of the a.c. signal on the signal transmission line at every communication time mentioned.

The first transmission means delivers one of different kinds of a.c. signals, which are different in phase difference with respect to a reference a.c. signal, to the signal transmission line at every predetermined communication time, whereby the first transmitter-receiver unit transmits the signal to the transmission line. The second receiving means identifies the phase difference of the a.c. signal on the transmission line with respect to the reference a.c. signal at every communication time mentioned, whereby the signal transmitted by the first transmitter-receiver unit is received by the second transmitter-receiver unit. Thus, the first unit transmits a signal to the second unit at every communication time.

The second transmission means changes the combination of positive and negative amplitudes of the a.c. signal on the transmission line to one of a plurality of kinds at every communication time mentioned, whereby a signal is transmitted from the second transmitter-receiver unit to the transmission line. The first receiving means identifies the combination of positive and negative amplitudes of the a.c. signal on the transmission line at every communication time mentioned, whereby the signal transmitted from the second transmitter-receiver unit is received by the first transmitter-receiver unit. Thus, the second unit transmits a signal to the first unit at every communication time.

Signals are identified by the second receiving means with reference to the phase difference concerned, and by the first receiving means with reference to the amplitude, so that transmission from the first unit to the second unit and transmission from the second unit to the first unit, i.e., bidirectional transmission, can be accomplished at the same time through a single signal transmission line.

The system of the first feature may be so adapted that the first transmission means delivers to the signal transmission line one of an a.c. signal having a please difference of 0 degree with respect to the reference a.c. signal and an a.c. signal having a phase difference of 180 degrees with respect to the reference a.c. signal.

The system may further be so adapted that the second transmission means changes the combination of positive and negative amplitudes of the a.c. signal on the signal transmission line to one of a state wherein the positive and negative amplitudes are both greater than a threshold value, a state wherein the positive amplitude is greater than the threshold value and the negative amplitude is smaller than the threshold value, and a state wherein the positive amplitude is smaller than the threshold value and the negative amplitude is greater than the threshold value.

The present invention provides as a second feature thereof a signal transmitter-receiver system comprising first and second two transmitter-receiver units interconnected by a signal transmission line, the first transmitter-receiver unit including first transmission means for delivering one of different kinds of a.c. signal different in frequency to the signal transmission line at every predetermined communication time, the second transmitter-receiver unit including second receiving means for identifying the frequency of the a.c. signal on the signal transmission line at every communication time mentioned, the second transmitter-receiver unit including second transmission means for changing the combination of positive and negative amplitudes of the a.c. signal on the signal transmission line to one of a plurality of kinds at every communication time mentioned, the first transmitter-receiver unit including first receiving means for identifying the combination of positive and negative amplitudes of the a.c. signal on the signal transmission line at every communication time mentioned.

The first transmission means delivers one of different kinds of a.c. signals, which are different in frequency, to the signal transmission line at every predetermined communication time, whereby the first transmitter-receiver unit transmits the signal to the transmission line. The second receiving means identifies the frequency of the a.c. signal on the transmission line at every communication time mentioned, whereby the signal transmitted by the first transmitter-receiver unit is received by the second transmitter-receiver unit. Thus, the first unit transmits a signal to the second unit at every communication time.

The second transmission means changes the combination of positive and negative amplitudes of the a.c. signal on the transmission line to one of a plurality of kinds at every communication time mentioned, whereby a signal is transmitted from the second transmitter-receiver unit to the transmission line. The first receiving means identifies the combination of positive and negative amplitudes of the a.c. signal on time transmission line at every communication time mentioned, whereby the signal transmitted from the second transmitter-receiver unit is received by the first transmitter-receiver unit. Thus, the second unit transmits a signal to the first unit at every communication time.

Signals are identified by the second receiving means with reference to the frequency and by the first receiving means with reference to the amplitude, so that transmission from the first unit to the second unit and transmission from the second unit to the first unit, i.e., bidirectional transmission, can be effected at the same time through a single signal transmission line.

The system of the second feature may be so constructed that the first transmission means comprises a plurality of a.c. power supplies which are different in frequency, and change-over means for selectively delivering one of the outputs of these a.c. power supplies.

The system may further be so adapted that the second transmission means changes the combination of positive and negative amplitudes of the a.c. signal on the signal transmission line to one of a state wherein the positive and negative amplitudes are both greater than a threshold value, a state wherein the positive amplitude is greater than the threshold value and the negative amplitude is smaller than the threshold value, and a state wherein time positive amplitude is smaller than the threshold value and the negative amplitude is greater than time threshold value.

As described above, the signal transmitter-receiver of the present invention is adapted for simultaneous bidirectional signal transmission between the first transmitter-receiver unit and the second transmitter-receiver unit with use of a single signal transmission line. This feature serves to shorten the period of time required for bidirectional transmission even widen aim increased number of signals are handled, enabling the single transmission line to transmit a larger number of signals.

DESCRIPTION OF THE PREFERRED EMBODIMENTS

With reference to the drawings, two embodiments of the invention will be described below which are adapted for use in conveyors of the type having self-propelled carriers and described above.

Although not shown, the conveyor of this type has a plurality of carriers self-propelled to travel along a running rail, and control station provided on the ground for controlling these carriers. The conveyor has a signal transmitter-receiver system adapted for bidirectional signal transmission between the control station and the carrier.

FIGS. 1 to 4 show such a system as a first embodiment.

Figure 1:
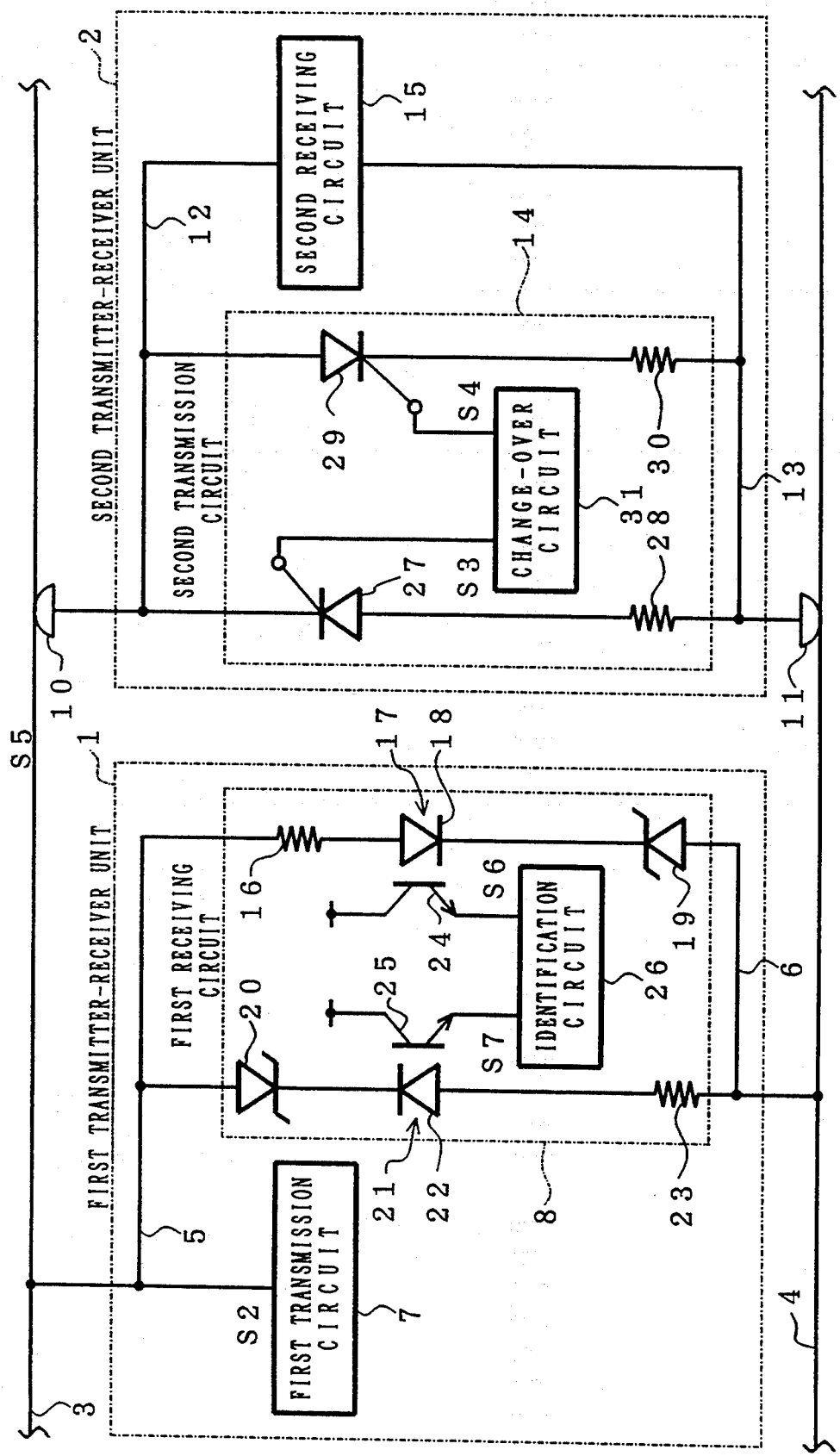
FIG. 1 is an electrical block diagram showing a first embodiment of the present invention, i.e., a signal transmitter-receiver system.

FIG. 1 schematically shows the construction of the signal transmitter-receiver system, which comprises a first transmitter-receiver unit (first unit) 1 provided at the control station, and a second transmitter-receiver unit (second unit) 2 provided on the carrier.

The running rail of the conveyor usually has three a.c. power lines, a plurality of signal transmission lines and one grounding conductor although FIG. 1 shows only one signal transmission line 3 and the grounding conductor 4. Further the transmission line 3 is divided into a plurality of insulated sections by a plurality of insulators, while FIG. 1 shows only one of the sections.

The first unit 1 is provided with a first signal transmission line (first transmission line) 5 and a first grounding conductor 6 fixedly connected respectively to the transmission line 3 and the grounding conductor 4 on the rail. The first unit 1 further comprises a first transmission circuit 7 and a first receiving circuit 8.

The control station is equipped with power supply lines fixedly connected to the power supply lines on the rail and signal transmission lines fixedly connected to the other signal transmission lines on the rail although these lines are not shown.

The first unit 1 is provided for each of the insulated sections of the transmission line 3 on the rail. Although the signals to be transmitted and received by the unit differ from section to section, only one unit 1 is shown in FIG. 1.

The carrier has collectors 10 and 11 slidable in contact with the transmission line 3 and the grounding conductor 4 on the rail, respectively. The second unit 2 has a second signal transmission line (second transmission line) 12 connected to the collector 10 on the transmission line 3, and a second grounding conductor 13 connected to the collector 11 on the grounding conductor 4. The second unit 2 comprises a second transmission circuit 14 and a second receiving circuit 15.

The carrier has power supply lines connected to the power supply lines on the rail via collectors, and signal transmission lines connected to the other signal transmission lines on the rail through collectors although these lines are not shown.

Figure 2:
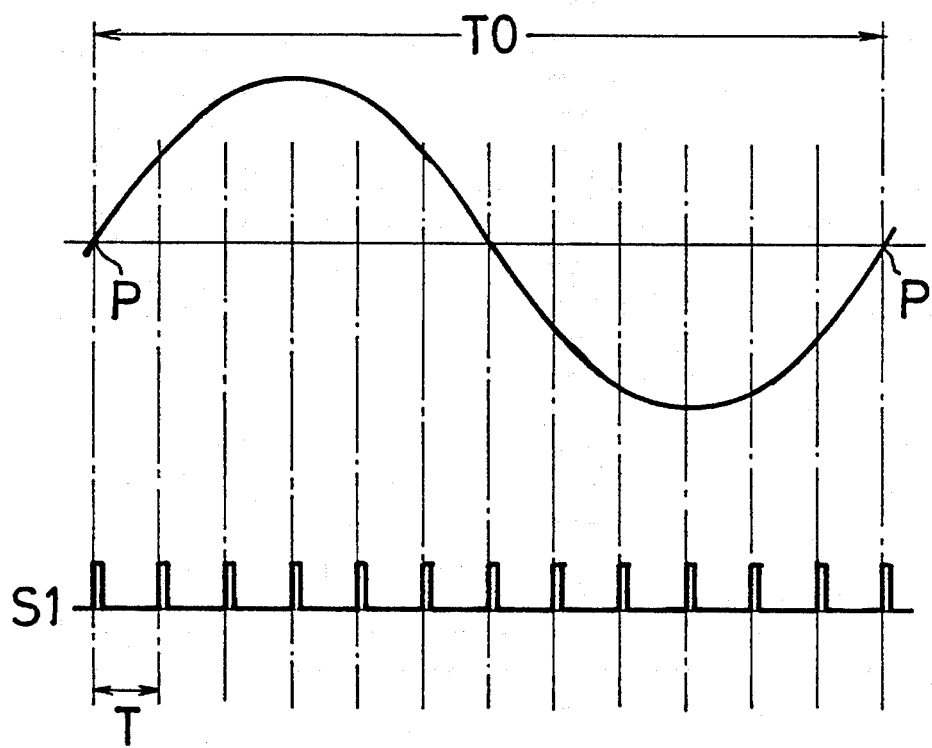
FIG. 2 is a time chart showing the output of an a.c. power supply and synchronizing pulses.
Figure 3A:
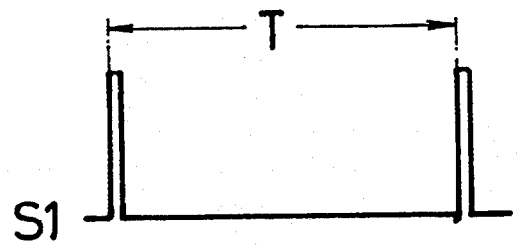
FIG. 3 is a time chart showing a reference a.c. signal and two output signals of a first transmission circuit.
Figure 3B:
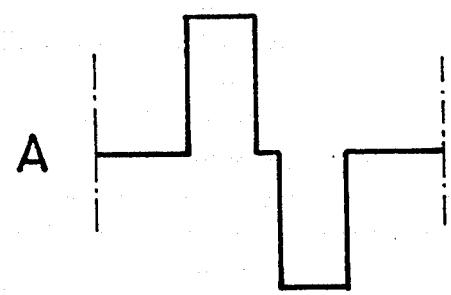
Figure 3C:
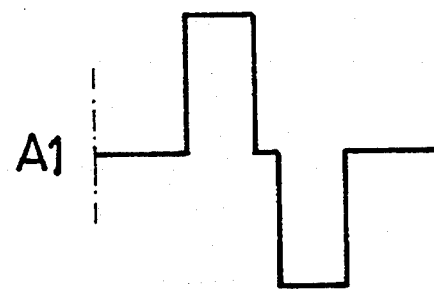
Figure 3D:
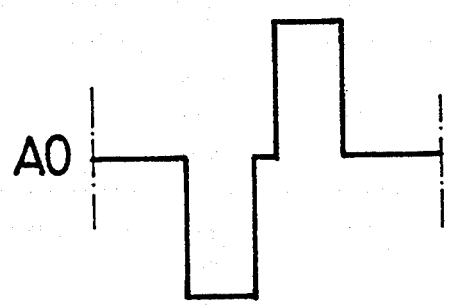
Figure 4A:
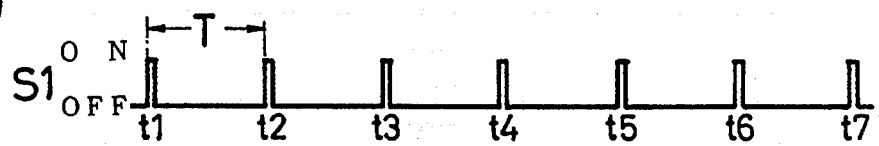
FIG. 4 is a time chart showing signals at various portions of the signal transmitter-receiver system of FIG. 1.
Figure 4B:
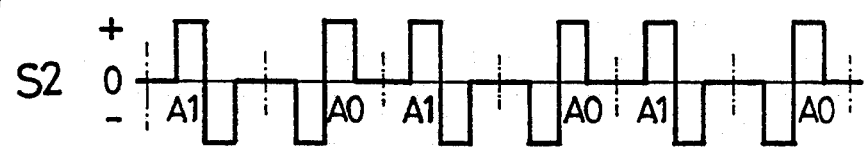
Figure 4C:
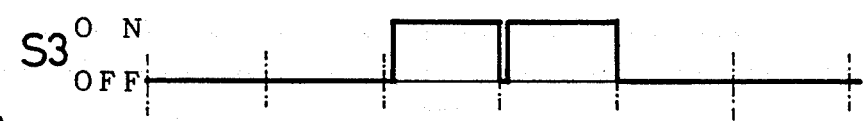
Figure 4D:
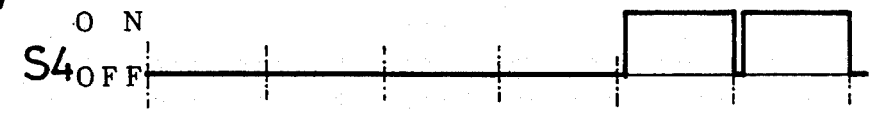
Figure 4E:
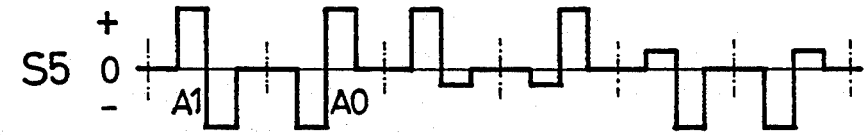
Figure 4F:
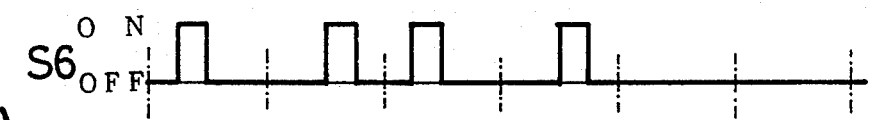
Figure 4G:
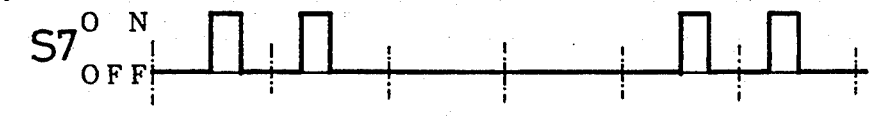

As shown in FIG. 2, the first unit 1 and the second unit 2 utilize the zero-cross point P where one phase of a common commercial three-phase a.c. power supplied to the power source for the rail changes from negative (−) to positive (+) to prepare a plurality of synchronizing pulses S1 per cycle T0, each at every predetermined communication time T, and to operate the first transmission circuit 7, first receiving circuit 8, second transmission circuit 14 and second receiving circuit 15 in synchronism with pulses S1, whereby 1-bit signals are transmitted between the units 1 and 2 during each period of communication time T. In the present embodiment, the cycle T0 is 1/60 second, and the communication time T is 1/720 second, so that the number of synchronizing pulses S1 during one cycle T0 is 12. Accordingly, twelve bit signals are transmitted or received during one cycle T0. At either of the two units 1 and 2, it is possible to recognize the particular bit signal being currently transmitted or received. Such method of transmitting and receiving signals is already known.

The first transmission circuit 7 serving as first transmission means delivers an output signal S2 to the transmission line 3 via the first transmission line 5 during every communication time T. The signal S2 is one of different kinds of a.c. signals which are different in phase difference with respect to a reference a.c. signal. In the present embodiment, the circuit 7 delivers two kinds of signals representing "1" and "0" as shown in FIG. 3. More specifically, FIG. 3, (a) shows synchronizing pulses S1; and FIG. 3, (b), the reference a.c. signal which is indicated at A. FIG. 3, (c) shows an a.c. signal A1 which is 0 degree in phase difference with respect ot the reference a.c. signal A and which represents "1". FIG. 3, (d) shows an a.c. signal A0 which is 180 degrees in phase difference with respect to the reference a.c. signal A and which represents "0".

The first receiving circuit 8 has the following construction.

Connected in parallel between the first transmission line 5 and the first grounding conductor 6 are a series circuit comprising a resistor 16, a light-emitting diode (first light-emitting diode) 18 constituting a first photocoupler 17, and a first constant-voltage diode 19, and a series circuit comprising a second constant-voltage diode 20, a light-emitting diode (second light-emitting diode) 22 providing a second photocoupler 21, and a resistor 23. The first light-emitting diode 18 and the second constant-voltage diode 20, as directed from the first transmission line (5) side toward the first grounding conductor (6) side, is in the forward direction. The first constant-voltage diode 19 and the second light-emitting diode 22, as directed from the first grounding conductor (6) side toward the first transmission line (5) side, are in the forward direction. The two constant-voltage diodes 19, 20 have approximately equal breakdown voltages VB. The two photocouplers 17, 21 respectively have phototransistors 24, 25, the emitters of which are connected to an identification circuit 26 for identifying the two kinds of signals "0" and "1" individually.

The first receiving circuit 8 serves as first receiving means for receiving signals from the second unit 2 by discriminating the combinations of positive and negative amplitudes of a.c. signals on the first transmission line 5 with reference to the breakdown voltage VB of the constant-voltage diodes 19, 20 as a threshold value.

The second transmission circuit 14 has the following construction.

Connected in parallel between the second transmission line 12 and the second grounding conductor 13 is a series circuit comprising a first thyristor 27 and a resistor 28, and a series circuit comprising a second thyristor 29 and a resistor 30. The first thyristor 27, as directed from the second grounding conductor (13) side toward the second transmission line (12) side, is in the forward direction. The second thyristor 29, as directed from the second transmission line (12) side toward the second grounding conductor (13) side, is in the forward direction. The two thyristors 27, 29 have their G terminals connected to a change-over circuit 31.

The second transmission circuit 14 provides second transmission means for changing-over combinations of positive and negative amplitudes of a.c. signals on the second transmission line 12 to either of two states representing "1" and "0" by controlling the thyristors 27, 29 with the change-over circuit 31. In the present embodiment, the two states are a state wherein the positive amplitude is greater than a threshold value and the negative amplitude is smaller than the threshold value (the state representing "1"), and a state wherein the positive amplitude is smaller than the threshold value and the negative amplitude is greater than the threshold value (the state representing "0").

The second receiving circuit 15 checks a.c. signals on the second transmission line 12 for the phase difference with respect to the reference a.c. signal A to thereby receive the signal transmitted from the first unit 1, thus serving as second receiving means.

The operation of the transmitter-receiver system will be described next with reference to FIG. 4.

FIG. 4 shows signals at various portions of the system during a first communication time from t1 to t2, second communication time from t2 to t3, third communication time from t3 to t4, fourth communication time from t4 to t5, fifth communication time from t5 to t6 and sixth communication time from t6 to t7, t1 to t7 being time points.

With reference to FIG. 4, synchronizing pulses S1 are shown in (a); the output of the first transmission circuit 7, i.e., a.c. signal S2, in (b); the G terminal voltage S3 of the first thyristor 27, in (c); the G terminal voltage S4 of the second thyristor 29, in (d); the a.c. signal S5 on "the transmission line 3, in (e); the output signal S6 of the first phototransistor 24, in (f); and the output signal S7 of the second phototransistor 25, in (g).

The first transmission circuit 7 outputs the aforementioned signal A1 with a phase difference of 0 degree or signal A0 with a phase difference of 180 degrees in every communication time T depending on the data of signal to be transmitted.

In every communication time T, the second transmission circuit 14 controls the G terminal voltages S3 and S4 of the two thyristors 27, 29 in the following manner. The G terminal voltages S3, S4 of the thyristors 27, 29 are both off when no signal is to be transmitted, the voltage S3 of the first thyristor 27 only is on when the signal "1" is to be transmitted, and the voltage S4 of the second thyristor 29 only is on when the signal "0" is to be transmitted.

During the first communication time t1–t2 and the second communication time t2–t3, the first unit 1 transmits the signal. "1" during the first time t1–t2 and the signal "0" during the second time t2–t3, but the second unit 2 transmits no signal during the first time t1–t2 and the second time t2–t3 as shown in FIG. 4.

Since the second unit 2 transmits no signal during the first communication time t1–t2 and the second communication time t2–t3, the G terminal voltages S3 and S4 of the two thyristors 27, 29 both remain off (see FIG. 4, (c) and (d)), with the result that these thyristors 27, 29 are both out of conduction. During the first communication time t1–t2, the first transmission circuit 7 outputs the signal A1 with a phase difference of 0 degree as the signal S2 for the transmission of "1", and at this time, the output S2 of the first transmission circuit 7, i.e., the signal A1 with a phase difference of 0 degree, appears as the signal S5 on the transmission line 3 (see FIG. 4, (e)) since the two thyristors 27, 29 are both out of conduction as stated above. During the next second communication time t2–t3, the first transmission circuit 7 delivers the signal A0 with a phase difference of 180 degrees as the signal S2 for the transmission of "0", and at this time, the output S2 of the first transmission circuit 7, i.e., the signal S0 with a phase difference of 180 degrees, appears as the signal S5 on the transmission line 3 (see FIG. 4, (e)) since the two thyristors 27, 29 are also both out of conduction as stated above.

The second receiving circuit 15 checks whether the phase difference of the signal S5 from the transmission line 3 with respect to the reference a.c. signal A is 0 degree or 180 degrees, and identifies the received signal as "1" if the difference is 0 degree or as "0" if it is 180 degrees. Incidentally, the phase difference is identified by detecting whether a positive half wave or negative half wave precedes in the communication time T, and is identified as 0 degree when the positive half wave precedes or as 180 degrees when the negative half wave precedes.

During the first communication time t1–t2, the output S2 of the first transmission circuit 7, i.e., the signal A1 with a phase difference of 0 degree, is the signal S5 on the transmission line 3 as already stated, so that the second receiving circuit 15 identifies the received signal as "1" and the signal "1" transmitted from the first unit 1 is received by the second unit 2.

During the second communication time t2–t3, the signal A0 having a phase difference of 180 degrees and delivered from the first transmission circuit 7 as S2 is the signal S5 on the transmission line 3, so that the second receiving circuit 15 identifies the received signal as "0". The signal "0" transmitted from the first unit 1 is received by the second unit 2.

In the communication time T, the identification circuit 26 of the first receiving circuit 8 identifies the signal received as "1" when the output S6 of the first phototransistor 24 only is on, or as "0" when the output S7 of the second phototransistor 25 only is on, or recognizes that no signal is received when both the outputs S6 and S7 are on.

During the first communication time t1–t2, the signal A1 having a phase difference of 0 degree and delivered from the first transmission circuit 7 as its output S2 is present on the transmission line 3 as its signal S5 as previously stated. The positive portion and negative portion of the signal S5 are therefore both great in amplitude and higher than the breakdown voltage VB of the constant-voltage diodes 19, 20. Consequently, while the signal S5 is positive, a current passes through the first light-emitting diode 18 for the first phototransistor 24 to produce an output S6, and while the signal S5 is negative, a current passes through the second light-emitting diode 22 for the second phototransistor 25 to deliver an output S7. Thus, both the phototransistors 24, 25 deliver their outputs S6, S7 within the time t1–t2. This indicates that no signal has been transmitted from the second unit 2.

During the second communication time t2–t3, the first unit 1 similarly recognizes the absence of signal from the second unit 2.

With reference to the third communication time t3–t4 and the fourth communication time t4–t5 shown in FIG. 4, the first unit 1 transmits the signal "1" during the third time t3–t4 and the signal "0" during the fourth time t4–t5, and the second unit 2 transmits the signal "1" during the third time t3–t4 and also during the fourth time t4–t5.

During the third communication time t3–t4, the first transmission circuit 7 outputs the signal A1 with a phase difference of 0 degree as the signal S2 for the transmission of "1". For the second transmission circuit 14 to transmit "1" at this time, the G terminal voltage S3 of the first thyristor 27 only is on (see FIG. 4, (c) and (d)), so that the second thyristor 29 is always out of conduction. The first thyristor 27 is in conduction while the output S2 of the first transmission circuit 7 is negative, and is out of conduction while the output S2 is positive. While the output S2 is positive, no current flows through the first thyristor 27 which is nonconductive, whereas while the output S2 is negative, a current passes through the first thyristor 27 which is conductive, so that the signal S5 on the transmission line 3 is great in amplitude at its positive portion and small in amplitude at its negative portion (see FIG. 4, (e)). The great amplitude of the positive portion is greater than the breakdown voltage VB, and the small amplitude of the negative portion is smaller than the breakdown voltage VB, with the result that while the signal S5 is positive, a current flows through the first light-emitting diode 18 for the first phototransistor 24 to deliver an output S6 (see FIG. 4, (f)). However, when the signal S5 becomes negative and smaller than the voltage VB in amplitude, no current passes through the second light-emitting diode 22 with the output S7 of the second phototransistor 25 remaining off (see FIG. 4, (g)). Within the communication time t3–t4, the output S6 of the first phototransistor 24 only thus becomes on, this indicating that the signal "1" has been transmitted from the second unit 2.

During the fourth communication time t4–t5, the first unit 1 similarly recognizes transmission of the signal "1" from the second unit 2.

In this case, the negative portion of the signal S5 does not become 0 even if small in amplitude, so that as in the case of the first and second communication periods t1–t2, t2–t3, the phase difference of the signal S5 enables the second receiving circuit 15 to recognize whether the signal from the first unit 1 is "1" or "0"

With reference to the fifth communication time t5–t6 and the sixth communication time t6–t7 shown in FIG. 4, the first unit 1 transmits the signal "1" during the fifth time t5–t6 and time signal "0" during the sixth time t6–67, and the second unit 2 transmits the signal "0"

during the fifth time t5–t6 and also during the sixth time t6–t7.

During the fifth communication time t5–t6, the first transmission circuit 7 produces the signal A1 with a phase difference of 0 degree as the signal S2 for the transmission of "1". For the second transmission circuit 14 to transmit "0" at this time, the G terminal voltage S4 of the second thyristor 29 only is on (see FIG. 4, (c) and (d)), so that the first thyristor 27 is always out of conduction. The second thyristor 29 is in conduction while the output S2 of the first transmission circuit 7 is positive, and is out of conduction while the output S2 is negative. While the output S2 is negative, no-current flows through the second thyristor 29 which is nonconductive, whereas while the output S2 is positive, a current flows through the second thyristor 29 which is conductive, so that the signal S5 on the transmission line 3 is great in amplitude at its negative portion and small in amplitude at its positive portion (see FIG. 4, (e)). The great amplitude of the negative portion is greater than the breakdown voltage VB, and the small amplitude of the positive portion is smaller than the breakdown voltage VB, with the result that while the signal S5 is negative, a current flows through the second light-emitting diode 22 for the second phototransistor 25 to produce an output S7 (see FIG. 4, (g)). However, since the signal S5, when positive, is smaller than the threshold voltage VB in amplitude, no current passes through the first light-emitting diode 18 with the output S6 of the first phototransistor 24 remaining off (see FIG. 4, (f)). Within the communication time t5–t6, the output S7 of the second phototransistor 25 only thus becomes on. This indicates that the signal "0" has been transmitted from the second unit 2.

During the sixth communication time t6–t7, the first unit 1 similarly recognizes transmission of the signal "0" from the second unit 2.

In this case, the positive portion of the signal S5 does not become 0 even if small in amplitude, so that as in the case of the first and second communication periods t1–t2, t2–t3, the phase difference of the signal S5 enables the second receiving circuit 15 to recognize whether the signal from the first unit 1 is "1" or "0".

FIGS. 5 to 9 show a second embodiment, i.e., another signal transmitter-receiver system.

Figure 5:
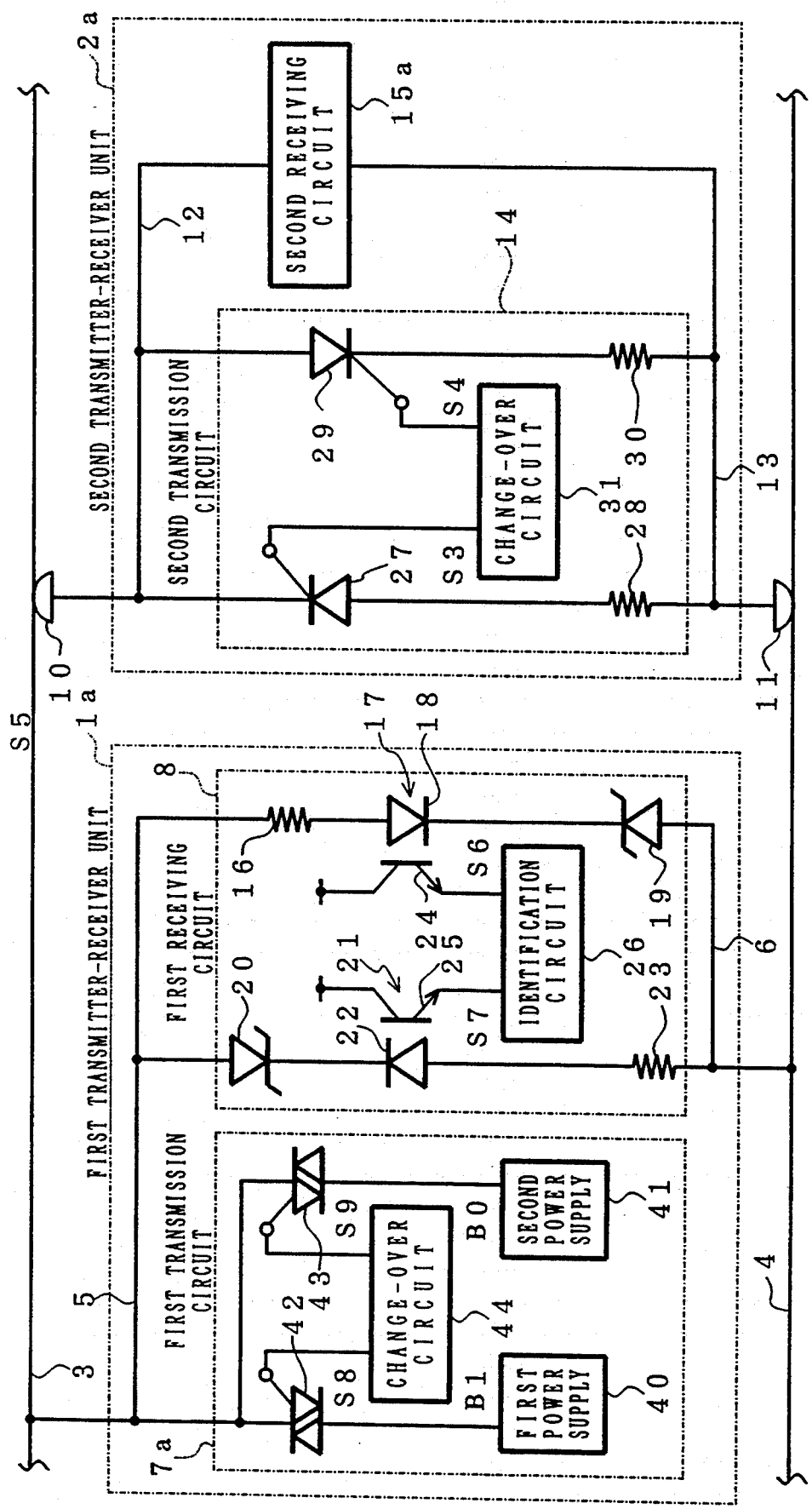
FIG. 5 is an electrical block diagram showing another signal transmitter-receiver system as a second embodiment of the invention.

FIG. 5 schematically shows the construction of the system. Throughout FIGS. 1 to 9, like parts are designated by like reference numerals or symbols.

Figure 6A:
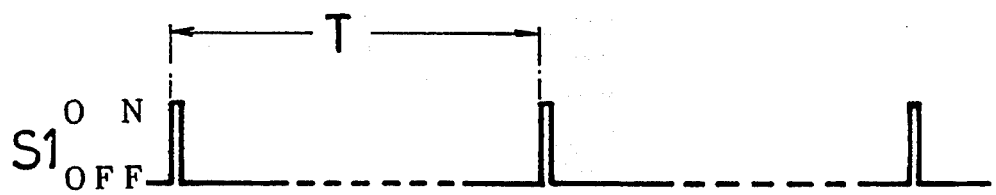
FIG. 6 is a time chart showing synchronizing pulses and the outputs of two power supplies.
Figure 6B:
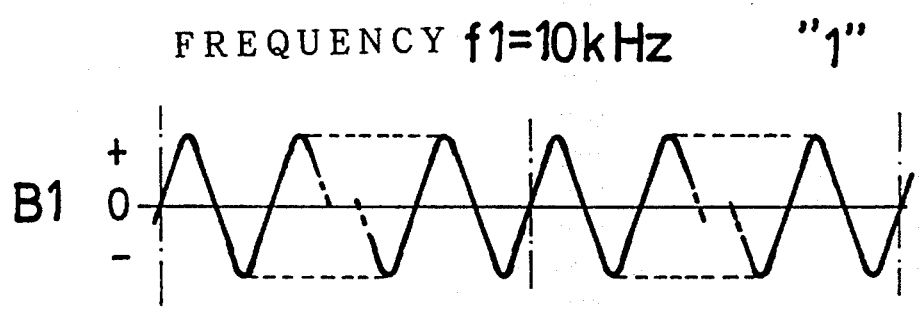
Figure 6C:
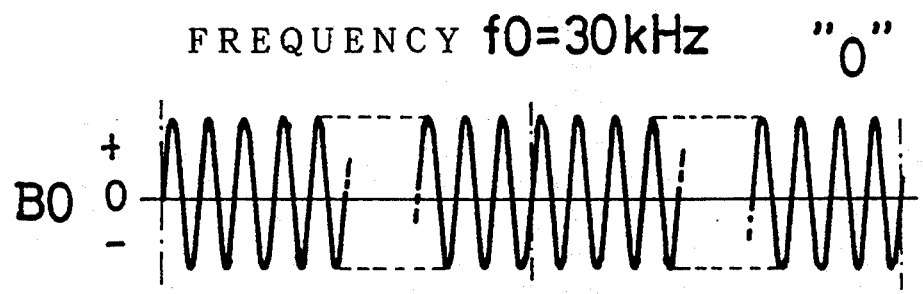
Figure 7A:
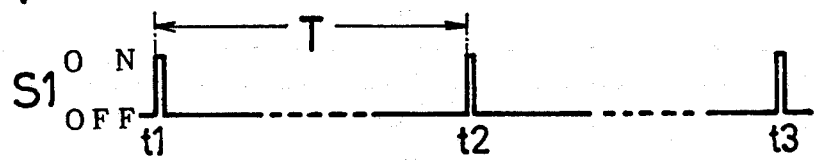
FIG. 7 is a time chart showing signals at various portion of the signal transmitter-receiver system of FIG. 5 during the period between two time points.
Figure 7B:
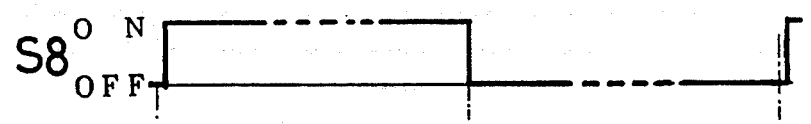
Figure 7C:
Figure 7D:
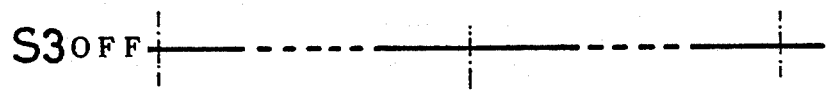
Figure 7E:
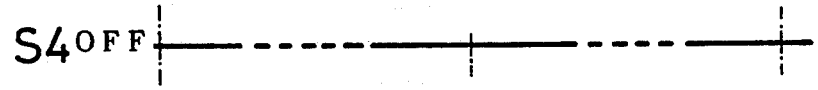
Figure 7F:
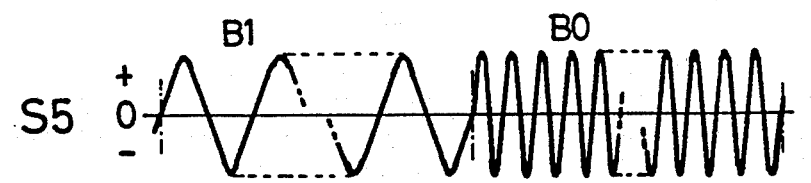
Figure 7G:
Figure 7H:
Figure 8A:
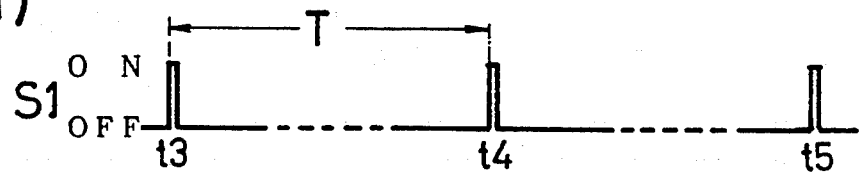
FIG. 8 is a time chart showing signals at the various portions of the signal transmitter-receiver system of FIG. 5 during the period between two time points subsequent to those of FIG. 7.
Figure 8B:
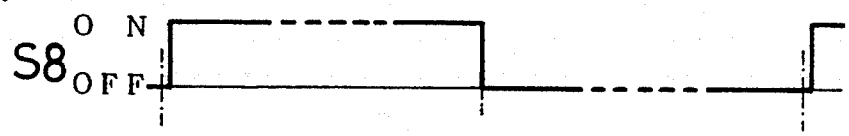
Figure 8C:
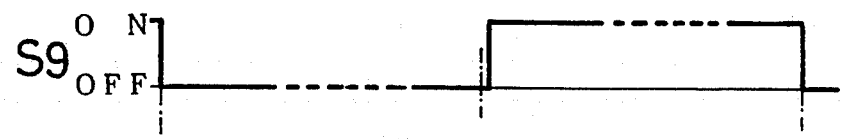
Figure 8D:
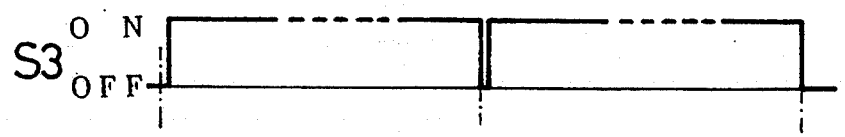
Figure 8E:
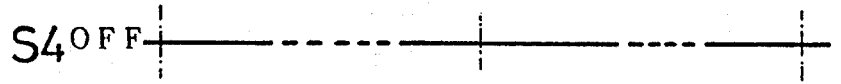
Figure 8F:
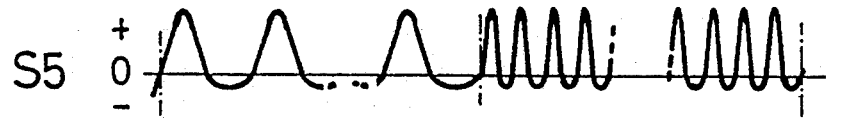
Figure 8G:
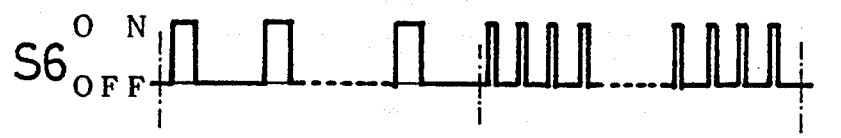
Figure 8H:
Figure 9A:
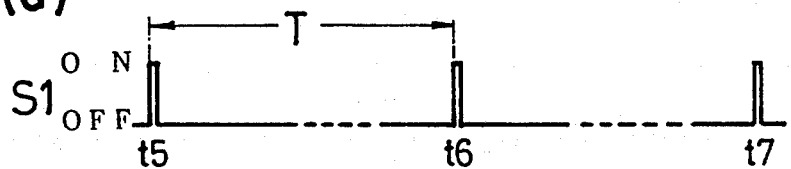
FIG. 9 is a time chart showing signals at the various portions of the system of FIG. 5 during the period between two time points subsequent to those of FIG. 8.
Figure 9B:
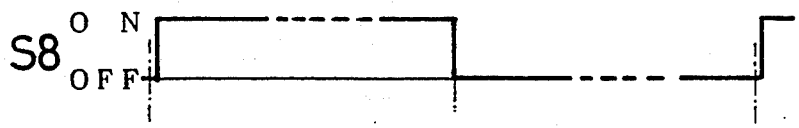
Figure 9C:
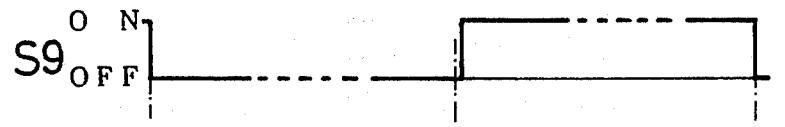
Figure 9D:
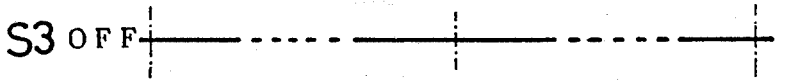
Figure 9E:
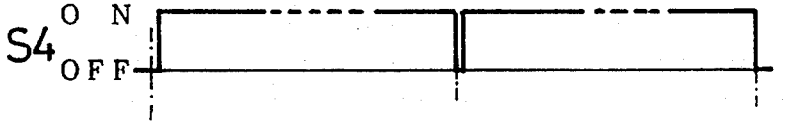
Figure 9F:
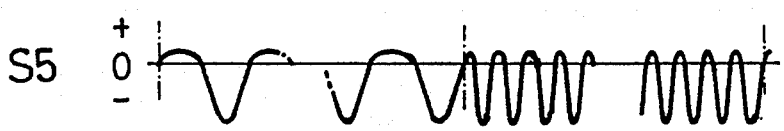
Figure 9G:
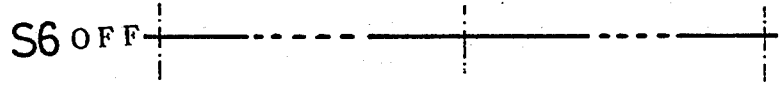
Figure 9H:

A first unit 1a has a first transmission circuit 7a including two signal a.c. power supplies 40 and 41 which are different in frequency. Synchronizing pulses S1 are shown in FIG. 6, (a); the output B1 of the first power supply 40, in the same, (b); and the output B0 of the second power supply 41, in the same, (c). The outputs B1, B0 of the two power supplies 40, 41 are definite. For example, the first power supply 40 has a frequency f1 of 10 kHz, and the second power supply 41 has a frequency f0 of 30 kHz.

The T2 terminal of a first triac 42 is connected to the first power supply 40, and the T2 terminal of a second triac 43 to the second power supply 41. The T1 terminals of these triacs 42, 43 are connected to a first transmission line 5. The two triacs 42, 43 have their G terminals connected to a change-over circuit 44.

The first transmission circuit 7a serving as first transmission means delivers one of different a.c. signals, which are different in frequency, to a transmission line 3 via the first transmission line 5 during every communication time T. In the present embodiment, the line 3 is alternatively given the output B1 of the first power supply 40 representing "1", or the output B0 of the second power supply 41 representing "0" as one of the different signals.

A second unit 2a has a second receiving circuit 15a for checking an a.c. signal on a second transmission line 12 for frequency to thereby receive the signal transmitted from the first unit 1a, the circuit 15a thus serving as second receiving means.

The second embodiment has the same construction as the first with the exception of the above feature.

The operation of the transmitter-receiver system described above will be described next with reference to FIGS. 7 to 9.

These drawings show signals at various portions of the system. More specifically, signals during a first communication time t1–t2 and a second communication time t2–t3 are shown in FIG. 7, those during a third communication time t3–t4 and a fourth communication time t4–t5 in FIG. 8, and those during a fifth communication time t5–t6 and a sixth communication time t6–t7 in FIG. 9.

With reference to each of FIGS. 7 to 9, synchronizing pulses S1 are shown in (a), the G terminal voltage S8 of the first triac 42 in (b), the G terminal voltage S9 of the second triac 43 in (c), the G terminal voltage S3 of the first thyristor 27 in (d), the G terminal voltage S4 of the second thyristor 29 in (e), the a.c. signal S5 on the transmission line 3 in (f), the output signal S6 of the first phototransistor 24 in (g), and the output signal. S7 of the second phototransistor 25 in (h).

The first transmission circuit 7a brings one of the G terminal voltages S8, S9 of the two triacs 42, 43 into ON state during every communication period T depending on the data of signal to be transmitted. The circuit 7a brings into ON state the voltage S8 of the first triac 42 only when transmitting the signal "1" or the voltage S9 of the second triac 43 only when transmitting the signal "0".

The second transmission circuit 14 operates in the same manner as in the first embodiment.

With reference to FIG. 7, the first unit 1a transmits the signal "1" during the first communication time t1–t2 and the signal. "0" during the second communication time t2–t3, while the second unit 2a transmits no signal during the first and second communication periods t1–t2 and t2–t3.

Since the second unit 2a transmits no signal during the first communication time t1–t2 and the second communication time t2–t3, the G terminal voltages S3 and S4 of the two thyristors 27, 29 both remain off (see FIG. 7, (d) and (e)), with the result that these thyristors 27, 29 are both out of conduction. During the first communication time t1–t2, the first transmission circuit 7a holds the voltage S8 of the first triac 42 only on for the transmission of "1" (see FIG. 7, (b), (c)), consequently holding the first triac 42 only in conductive state and thereby connecting the first power supply 40 to the transmission line 3. At this time, the two thyristors 27, 28 are both out of conduction as previously stated, so that the output B1 of the first power supply 40 appears as the signal S5 on the transmission line 3 (see FIG. 7, (f)). During the next second communication time t2–t3, the first transmission circuit 7a holds the voltage S9 of the second triac 43 only on for the transmission of "0" (see FIG. 7, (b), (c)), thus holding the second triac 43 only in conduction and thereby connecting the second power supply 41 to the transmission line 3. Since the two thyristors 27, 29 are both out of conduction also at this time as previously stated the output B0 of the second power supply 41 appears as the signal S5 on the transmission line 3 (see FIG. 7, (f)).

The second receiving circuit 15a checks whether the frequency of the signal S5 on the transmission line 3 is f1 or f0, and identifies the received signal as "1" if the frequency is f1 or as "0" when it is f0.

During the first communication time t1–t2, the output B1 of the first power supply 40 with a frequency of f1 is the signal S5 on the transmission line 3 as already stated, so that the second receiving circuit 5a identifies the received signal as "1", and the signal "1" transmitted from the first unit 1a is received by the second unit 2a.

During the second communication time t2–t3, the output B0 of the second power supply 41 with a frequency of f0 is the signal. S5 on the transmission line 3 as previously stated, so that the second receiving circuit 15a identifies the received signal as "0", and the signal "0" transmitted from the first unit a is received by the second unit 2a.

The first receiving circuit 8 operates in the same manner as in the first embodiment.

During the first communication time t1–t2, the output B1 having a frequency of f1 and given by the first power supply 40 is present on the transmission line 3 as its signal S5 as previously stated. The positive portion and negative portion of the signal S5 are both great in amplitude and slightly higher than the breakdown voltage VB of the constant-voltage diodes 19, 20. Consequently, while the signal S5 is positive and higher than the breakdown voltage VB, a current passes through the first light-emitting diodes 18 for the first phototransistor 24 to produce an output S6, and while the signal. S5 is negative and higher than the threshold voltage VB, a current flows through the second light-emitting diode 22 for the second phototransistor 25 to deliver an output S7. Thus, both the phototransistors 24, 25 produce their outputs S6, S7 within the time t1–t2, indicating that no signal has been transmitted from the second unit 2a.

During the second communication time t2–t3, the first unit 1a similarly recognizes the absence of signal from the second unit 2a.

With reference to FIG. 8, the first unit 1a transmits the signal "1" during the third communication time t3–t4 and the signal "0" during the fourth communication time t4–t5 as in the case of FIG. 7, and the second unit 2a transmits the signal "1" during the third communication time t3–t4 and also during the fourth communication time t4–t5.

During the third communication time t3–t4, the first transmission circuit 7a holds the G terminal voltage S8 of the first triac 42 only on for the transmission of "1" (see FIG. 8, (b), (c)), consequently maintaining the first triac 42 only in conductive state and connecting the first power supply 40 to the transmission line 3. At this time, the second transmission circuit 14 holds the G terminal voltage S3 of the first thyristor 27 only on for the transmission of "1" (see FIG. 8, (d), (e)), so that the second thyristor 29 is always out of conduction. The first thyristor 27 is in conduction while the output B1 of the first power supply 40 is negative, and is out of conduction while the output B1 is positive. While the output B1 is positive, no current flows through the first thyristor 27 which is nonconductive, whereas while the output B1 is negative, a current passes through the first thyristor 27 which is conductive. As a result, the amplitude of positive portion of the signal S5 on the transmission line 3 is greater than the breakdown voltage VB, and the amplitude of negative portion thereof is smaller than the breakdown voltage VB (see FIG. 8, (f)). Therefore, while the signal S5 is positive with its voltage exceeding the voltage VB, a current flows through the first light-emitting diode 18 for the first phototransistor 24 to produce an output S6 (see FIG. 8, (g)). However, when the signal S5 becomes negative with an amplitude smaller than the breakdown voltage VB, no current passes through the second light-emitting diode 22 with the output S7 of the second phototransistor 25 remaining off (see FIG. 8, (h)). Within the communication time t3–t4, the output S6 of the first phototransistor 24 only thus becomes on, indicating that the signal "1" has been transmitted from the second unit 2a.

During the fourth communication time t4–t5, the first unit 1a similarly recognizes transmission of the signal "1" from the second unit 2a.

In this case, the signal S5 remains unchanged in frequency even if having a diminished negative amplitude, so that as in the case of the first and second communication periods t1–t2, t2–t3, the frequency of the signal S5 enables the second receiving circuit 15a to recognize whether the signal from the first unit 1a is "1" or "0".

With reference to FIG. 9, the first unit 1a transmits the signal "1" during the fifth communication time t5–t6 and the signal "0" during the sixth communication time t6–t7 as in the case of FIG. 7, and the second unit 2a transmits the signal "0" during the fifth communication time t5–t6 and also during the sixth communication time t6–t7.

During the fifth communication time t5–t6, the first transmission circuit 7a holds the G terminal voltage S8 of the first triac 42 only on for the transmission of "1" (see FIG. 9, (b), (c)), consequently maintaining the first triac 42 only in conductive state and connecting the first power supply 40 to time transmission line 3. At this time, the second transmission circuit 14 holds the G terminal voltage S4 of the second thyristor 29 only on for the transmission of "0" (see FIG. (, (d), (e)), so that the first thyristor 27 is always out of conduction. The second thyristor 29 is in conduction while the output B1 of the first power supply 40 is positive, and is out of conduction while the output B1 is negative. While the output B1 is negative, no current flow through the second thyristor 29 which is nonconductive, whereas while the output B1 is positive, a current passes through the second thyristor 29 which is conductive. As a result, the amplitude of negative portion of the signal S5 on the transmission line 3 is greater than the breakdown voltage VB, and the amplitude of positive portion thereof is smaller than the breakdown voltage VB (see FIG. 9, (f)). Therefore, while the signal S5 is negative with its voltage exceeding the voltage VB, a current flows through the second light-emitting diode 22 for the second phototransistor 25 to produce an output S7 (see FIG. 9, (h)). However, when the signal S5 becomes positive with an amplitude smaller than the breakdown voltage VB, no current passes through the first light-emitting diode 18 with the output S6 of the first phototransistor 24 remaining off (see FIG. 9, (g)). In the communication time t5–t6, the output S7 of the second phototransistor 25 only thus becomes on, indicating that the signal "0" has been transmitted from the second unit 2a.

During the sixth communication time t6–t7, the first unit 1a similarly recognizes transmission of the signal "0" from the second unit 2a.

In this case, the signal S5 remains unchanged in frequency even if having a diminished positive amplitude, so that as in the first and second communication periods t1–t2, t2–t3, the frequency of the signal S5 enables the second receiving circuit 15a to recognize whether the signal from the first unit 1a is "1" or "0".

What is claimed is:

1. A signal transmitter-receiver system comprising first and second transmitter-receiver units interconnected by a signal transmission line, the first transmission-receiver unit including first transmission means for delivering an a.c. signal, selected among a plurality of a.c. signals each having a distinct phase difference with respect to a reference a.c. signal to the signal transmission line at each of predetermined communication time intervals, the second transmitter-receiver unit including second receiving means for identifying the phase difference of the a.c. signal on the signal transmission line with respect to the reference a.c. signal at each communication time interval, the second transmitter-receiver unit including second transmission means for changing the combination of positive and negative amplitudes of the a.c. signal on the signal transmission line to one of a plurality of states at each communication time interval, the first transmitter-receiver unit including first receiving means for identifying the state of the combination of positive and negative amplitudes of the a.c. signal on the signal transmission line at each communication time interval.

2. A signal transmitter-receiver system as defined in claim 1 wherein the first transmission means delivers to the signal transmission line one of an a.c. signal having a phase difference of 0 degree with respect to the reference a.c. signal and an a.c. signal having a phase difference of 180 degrees with respect to the reference a.c. signal.

3. A signal transmitter-receiver system as defined in claim 1 wherein the second transmission means changes the combination of positive and negative amplitudes of the a.c. signal on the signal transmission line to one of a state wherein the positive and negative amplitudes are both greater than a threshold value, a state wherein the positive amplitude is greater than the threshold value and the negative amplitude is smaller than the threshold value, and a state wherein the positive amplitude is smaller than the threshold value and the negative amplitude is greater than the threshold value.

4. A signal transmitter-receiver system comprising first and second transmitter-receiver units interconnected by a signal transmission line, the first transmitter-receiver unit including first transmission means for delivering an a.c. signal, selected from among a plurality of a.c. signals each having a distinct frequency to the signal transmission line at each of predetermined communication time intervals, the second transmitter-receiver unit including second receiving means for identifying the frequency of the a.c. signal on the signal transmission line at each communication time interval, the second transmitter-receiver unit including second transmission means for changing the combination of positive and negative amplitudes of the a.c. signal on the signal transmission line to one of a plurality of states at each communication time interval, the first transmitter-receiver unit including first receiving means for identifying the state of the combination of positive and negative amplitudes of the a.c. signal on the signal transmission line at each communication time interval.

5. A signal transmitter-receiver system as defined in claim 4 wherein the first transmission means comprises a plurality of a.c. power supplies which are different in frequency, and change-over means for selectively delivering one of the outputs of the a.c. power supplies.

6. A signal transmitter-receiver system as defined in claim 4 wherein the second transmission means changes the combination of positive and negative amplitudes of the a.c. signal on the signal transmission line to one of a state wherein the positive and negative amplitudes are both greater than a threshold value, a state wherein the positive amplitude is greater than the threshold value and the negative amplitude is smaller than the threshold value, and a state wherein the positive amplitude is smaller than the threshold value and the negative amplitude is greater than the threshold value.

* * * * *